United States Patent
Böhm et al.

(10) Patent No.: US 9,317,822 B2
(45) Date of Patent: Apr. 19, 2016

(54) WORKFLOW CENTERED MECHATRONIC OBJECTS

(75) Inventors: Birthe Böhm, Nürnberg (DE); Norbert Gewald, Erlanger (DE); Thilo Tetzner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1088 days.

(21) Appl. No.: 13/393,189

(22) PCT Filed: Nov. 6, 2009

(86) PCT No.: PCT/EP2009/064721
§ 371 (c)(1),
(2), (4) Date: Feb. 28, 2012

(87) PCT Pub. No.: WO2011/023239
PCT Pub. Date: Mar. 3, 2011

(65) Prior Publication Data
US 2012/0158165 A1 Jun. 21, 2012

(30) Foreign Application Priority Data
Aug. 31, 2009 (EP) .................................... 09011181

(51) Int. Cl.
*G05B 15/00* (2006.01)
*G06F 9/44* (2006.01)
(Continued)

(52) U.S. Cl.
CPC ............ *G06Q 10/06* (2013.01); *G05B 19/4188* (2013.01); *G06F 11/3409* (2013.01); *G06Q 10/00* (2013.01); *G06Q 10/107* (2013.01)

(58) Field of Classification Search
CPC ...... G05B 17/02; G05B 9/03; G05B 19/0426; G05B 19/416; G05B 19/41485; G05B 19/4188; G05B 2219/32035; G05B 19/41845; G05B 19/41865; G05B 19/41885; A61B 5/681; A61B 5/1117; A61B 5/0006; A61B 5/0402; A61B 5/0022; G06F 11/3409; G06F 8/45; G06Q 10/06; G06Q 10/00; G06Q 10/107

See application file for complete search history.

(56) References Cited

U.S. PATENT DOCUMENTS

| 8,145,333 B2 * | 3/2012 | Vrba ................. G05B 19/4188 700/100 |
| 2003/0172371 A1 * | 9/2003 | Offenmuller .......... G06Q 10/06 717/120 |

(Continued)

OTHER PUBLICATIONS

Patrick F. Muir et al., Mechatronic objects for real-time control software development, SPIE vol. 3518, Nov. 1998, [Retrieved on Mar. 9, 2015]. Retrieved from the internet: <URL: http://www.msl.ri.cmu.edu/publications/pdfs/muir_patrick$_{1998}$_1.pdf> 15 Pages (251-265).*

(Continued)

*Primary Examiner* — Thuy Dao
*Assistant Examiner* — Anibal Rivera
(74) *Attorney, Agent, or Firm* — Cozen O'Connor (57) ABSTRACT

A method for generating workflows for product development or for the design or the operation of industrial systems, wherein the workflow comprises activities, inputs, outputs, attributes, and time dependencies for the activities, wherein the method comprises providing software objects representing parts, functions and/or artifacts of the product or the industrial systems, assembling the software objects by interconnecting them via the interfaces to design a product or an industrial system, generating the workflow for product development or for the design or operation of an industrial system based on the workflow information.

14 Claims, 8 Drawing Sheets

(51) Int. Cl.
*G06F 9/45* (2006.01)
*G06F 3/048* (2013.01)
*G06Q 10/06* (2012.01)
*G05B 19/418* (2006.01)
*G06F 11/34* (2006.01)
*G06Q 10/00* (2012.01)
*G06Q 10/10* (2012.01)

(56) References Cited

U.S. PATENT DOCUMENTS

| | | | | |
|---|---|---|---|---|
| 2003/0217053 | A1* | 11/2003 | Bachman | G06Q 10/107 707/999.004 |
| 2003/0229524 | A1* | 12/2003 | Reuveni | G06F 11/3409 705/7.11 |
| 2004/0030461 | A1* | 2/2004 | Flores | B62D 65/00 701/1 |
| 2006/0015315 | A1* | 1/2006 | Colombo | G05B 19/41845 703/22 |
| 2007/0106541 | A1* | 5/2007 | Raisanen | G06F 8/45 705/7.11 |
| 2008/0039959 | A1* | 2/2008 | Fister | G05B 19/0426 700/56 |
| 2009/0006997 | A1* | 1/2009 | Jiang | G06Q 10/00 715/771 |
| 2009/0088875 | A1* | 4/2009 | Baier | G06Q 10/06 700/83 |
| 2010/0049336 | A1* | 2/2010 | Colombo | H04L 67/02 700/9 |
| 2010/0083215 | A1* | 4/2010 | Bogl | G06Q 10/06 717/105 |
| 2010/0138017 | A1* | 6/2010 | Vrba et al. | 700/97 |

OTHER PUBLICATIONS

Lihui Wang et al., Collaborative Design and Planning for Digital Manufacturing, 2009, [Retrieved on Nov. 16, 2015]. Retrieved from the internet: <URL: http://download.springer.com/static/pdf/798/bok°/0253A978-1-84882-287-0.pdf?originUrl> 427 Pages (1-427).*

J. Marco Mendes et al., Service-Oriented Control Architecture for Reconfigurable Production Systems, Jul. 2008, [Retrieved on Nov. 16, 2015]. Retrieved from the internet: <URL: http://ieeexplore.ieee.org/stamp/stamp.jsp?tp=&arnumber=4618201> 6 Pages (744-749).*

EPO: "Notice from the European Patent Office dated Oct. 1, 2007 concerning business methods", Official Journal of the European Patent Office, vol. 30, No. 11, Nov. 1, 2007, pp. 592-593.

* cited by examiner

WORKFLOW CENTERED MECHATRONIC OBJECTS

CROSS-REFERENCE TO RELATED APPLICATIONS

This is a U.S. national stage of application No. PCT/EP2009/064721 filed 6 Nov. 2009. Priority is claimed on European Application No. 09011181.6 filed 31 Aug. 2009, the content of which is incorporated herein by reference in its entirety.

BACKGROUND OF THE INVENTION

1. Field of the Invention

The invention relates to computer aided design and, more particularly, to a method, a system, and a computer readable medium for designing products (e.g., Camcorder, automobiles, tool machines, roboters) or industrial systems (e.g., power plants), and for engineering manufacturing systems (e.g., production lines, assembly lines) or systems for process industries (e.g., refineries, breweries). The invention is also applicable for engineering automation systems and for engineering solutions for automation problems.

2. Description of the Related Art

Flexibility and re-configurability are the current paradigms that should be considered in product development and in the engineering and design of manufacturing systems or systems for process industries, such as oil refineries, chemical plants, or breweries. To deal with such requirements, the systems are considered an assembly of intelligent components (mechatronic objects) settled in an engineering system, a control framework or a control system. Mechatronic objects can be used for the design of complex manufacturing systems, such as large machinery. In particular, the programming languages and structures defined under the International Electro Technical Commission (IEC) 1131-3 norm are considered regarding software concepts (e.g., data encapsulation) by the design of mechanical systems represented by mechatronic objects. The concept of mechatronic objects is well known in literature. For example, see "Mechatronic objects for real-time control software development" by P. F. Muir and J. W. Homer in Proceedings of the 1998 SPIE International Symposium on Intelligent Systems and Advanced Manufacturing: Mechatronics Conference, Nov. 5, 1998, Boston.

Management and controlling tasks in product and project business is crucial for a successful design, production or implementation, operation, maintenance and service, modernization and, if necessary, scrapping of products as well as plants, i.e., during the whole lifecycle of products and plants. It is highly desirable for project manager and other responsible persons to know at any time in a project (which may be conducted in and across any lifecycle phase of a product or plant) the realistic status in terms of timelines, quality, and efforts or costs. And this should be possible without too much effort. During project implementation, the necessary activities have to be executed by the involved project members correctly and efficiently, which means that there should be also sufficient technical support for their daily work.

Current solutions and tools do not support project members with appropriate workflow information dedicated to special activities in a project in an adequate manner.

SUMMARY OF THE INVENTION

It is therefore an object of the present invention provide an efficient way of generating and providing dedicated workflow information for all kinds of project members which may be implemented using hardware or software.

This and other objects and advantages are achieved in accordance with the present invention by a method for generating workflows for product development or for the design or the operation of industrial systems, where the workflow comprises activities, inputs, outputs, attributes, and time dependencies for the activities. The method comprising providing software objects representing parts and/or functions and/or artefacts of the product or the industrial systems, where a software object comprises data for characterizing the software object and interfaces for intercommunication of the software objects and for communication with the environment of the product or the industrial system; assembling the software objects by interconnecting them via the interfaces to design a product or an industrial system, where the software objects have workflow information dedicated to a part, functions and/or artifacts of the product to be developed or the industrial system to be designed or operated; and generating the workflow for product development or for the design or the operation of an industrial system based on the workflow information.

This approach provides a solution for having fine-granular expert workflows while keeping the effort low and adjusting the workflow to project specific needs. The proposed method and system also enables centralized control of the workflow and can integrate all disciplines involved in a project, as well as supports different information views on the workflow from high-level management information up to very detailed workflows for technical tasks need to be executed by project members.

In an embodiment of the invention, the method further comprises storing the generated workflow in a memory unit. This supports the reuse and the electronically distribution of workflow documents.

In another embodiment of the invention, the method further comprises displaying the generated workflow on a display unit. This enables a graphical presentation and representation of views and aspects of workflows or parts of workflows for activities in the lifecycle of products or systems.

In further embodiment of the invention, the software objects representing parts, functions and/or artifacts of the product or the industrial systems are provided by an engineering system. Complex engineering projects are designed and managed by using engineering systems (e.g., CAD Systems "Computer Aided Design"). If the software objects to be designed and used in workflows are provided by an engineering system, the consistency between the objects used in the design and in the workflow description is secured.

In yet another embodiment of the invention the method further comprises migrating the generated workflow into a project management and/or planning tool. This supports the reusability and consistency of artefacts and objects used in workflow descriptions within project management and planning tooling.

In a further embodiment of the invention, the software object is a mechatronic object comprising data regarding the disciplines: mechanical engineering, electronic engineering, control engineering, systems design engineering, civil engineering and/or computer engineering. Therefore a mechatronic object can be used in all phases of the engineering or design process and furthermore a mechatronic object encapsulates views and data of these disciplines on a place where they are used. This means that these data and views are not scattered, they are localized in the object.

In a further embodiment of the invention, the software object carries different facets, where a facet comprises data for a respective discipline and for discipline spanning information. This supports the design principles of encapsulation and localization of information in an object. This also supports the use of mechatronic objects in all phases of the engineering, design, or development process.

In a still further embodiment of the invention, the workflow information is assigned to at least one facet belonging to the respective discipline. This allows the generation of discipline specific and discipline dedicated workflows. Also workflows can be generated which are dedicated to special roles in the lifecycle process.

In an even further embodiment of the invention, sub-workflows are generated according to disciplines or facets, where the sub-workflows are adapted to be aggregated to user defined super-workflows. This also allows the generation of discipline specific and discipline dedicated workflows and furthermore workflows spanning different disciplines or roles (e.g., project manager, quality manager) can be generated.

In still a further embodiment of the invention, the workflow is generated based on a workflow policy. A policy is the basis for the aggregation of workflow activities in super-ordinated mechatronic objects. For this purpose, the system can be parameterized by the user, e.g., for a specific phase in the plant lifecycle (e.g., design, commissioning, maintenance or scrapping), according to available resources (e.g., how many resources are available for mechanics or automation), prioritizations may be made based on the mechatronics objects tree (e.g., design plant area X before plant area Y), and general options may be selected (e.g., one person shall be assigned to one plant area/serialization of tasks in one plant area or as much parallelization as possible). The policy may be either created individually for each project, there may be a predefined strategy for all projects stored in the system or a standard or predefined policy can be adjusted for the single projects by the user. The concept of policies increases the flexibility generating workflows.

In another embodiment of the invention, the workflow is generated in a bottom up manner beginning with the most detailed software objects. Creating the project workflow bottom up from detailed mechatronic objects workflows closes the gap between project planning and technical support for project engineers. Today, the project workflow is not as detailed and the workflow definition is usually created or adapted manually based on generic templates which causes inconsistencies and does not provide dedicated workflows for activities and roles.

In still another embodiment of the invention, the workflow is generated in a bottom up manner starting from a user defined process layer or abstraction layer. This enables the abstraction from implementation details and employees (e.g., project manager, quality manager or project members) obtain specific workflow information which is adequate for their respective activity or role.

In further embodiment of the invention, the workflow is automatically generated by a computer implemented tool. This increases the productivity and efficiency of generating workflows. The workflows can be generated full automatic or half automatic. Half automatic means that a user can supplement or amend a workflow during the generating process.

Another object of the invention is to provide a non-transitory computer readable medium, having a program recorded thereon, wherein the program when executed causes a computer to execute the method steps of:

providing software objects representing parts, functions and/or artifacts of the product or the industrial systems, where a software object comprises data for characterizing the software object and interfaces for intercommunication of the software objects and for communication with the environment of the product or the industrial system;

assembling the software objects by interconnecting them via the interfaces to design a product or an industrial system, where the software objects having workflow information dedicated to a part, functions and/or artifacts of the product to be developed or the industrial system to be designed or operated; and automatically generating the workflow for product development or for the design or the operation of an industrial system based on the workflow information;

where the workflow comprises activities, inputs, outputs, and attributes for the activities and relationships between activities. The non-transitory computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CR-ROMs and DVDs; magneto-optical storage media, such as MOs; magnetism storage media, including but not limited to floppy disks, cassette tapes, and removable hard disks; media with a built-in rewriteable non-volatile memory, including but not limited to memory cards; and media with a built-in ROM, including but not limited to ROM cassettes; etc. Furthermore, various information regarding stored images, e.g., property information, may be stored in any other form, or it may be provided in other ways.

A further object of the invention is to provide a system for generating workflows for product development or for the design or the operation of industrial systems, where the workflow comprises activities, inputs, outputs, and attributes for the activities. The system comprises:

a providing unit for providing software objects representing parts, functions and/or artifacts of the product or the industrial systems, where a software object comprises data for characterizing the software object and interfaces for intercommunication of the software objects and for communication with the environment of the product or the industrial system;

a design unit for assembling the software objects by interconnecting them via the interfaces to design a product or an industrial system, where the software objects having workflow information dedicated to a part, functions and/or artifacts of the product to be developed or the industrial system to be designed or operated;

a generation unit for automatically generating the workflow for product development or for the design or the operation of an industrial system based on the workflow information;

a storing unit for storing the generated workflow; and an output unit for presenting the generated workflow. The system for generating workflows can be realized or implemented by using engineering or design workstations with engineering/design tooling (e.g., CAD tools) and commercial off the shelf hardware (e.g., Personal Computer) and operating systems (e.g., Windows™).

A further embodiment of the invention comprises a coupling mechanism for data exchange with an engineering system or a project management tool. This enables the reusability and supports the consistency within the tools and process stages.

All specified embodiments of the invention can be variegated or combined also in parts or in portions to build inventive arrangements regarding a method, a system or a computer readable medium.

Artifacts in the context of the present invention comprise requirements specification, design specification, functional specification, test specification, configuration information, parameterization information, detailed design artefacts for disciplines (e.g. code listings, wiring diagrams).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings, and in which.

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the present invention, as represented in FIGS. 1 through 10, is not intended to limit the scope of the invention, as claimed, but is merely representative of selected embodiments of the invention.

Mechatronics is the synergistic combination of mechanical engineering, electronic engineering, control engineering, systems design engineering, and computer engineering to create useful products or systems (e.g., manufacturing systems or systems for process industries or consumer products). This interdisciplinary engineering approach supports especially the design of hybrid systems comprising different disciplines (e.g., data processing, mechanics or electronics). Furthermore, this approach allows the generation of simpler, more economical, reliable and versatile systems. The main concept of this engineering approach is the concept of mechatronic objects. Mechatronic objects are kinds of software objects and support the paradigms of object oriented programming and system development: inheritance, encapsulation, instantiation, class concept etc.

The invention relies on the mechatronic concept that is described as follows. In current engineering, the integration of disciplines is an interesting topic. The expected benefit is that quality, construction time and cost can be improved by this integration. A good way to enable the integration of the different engineering disciplines is the mechatronic concept. The term mechatronic describes the interplay of different disciplines such as mechanical engineering, electrical engineering and software engineering and their components. The interplay is described with digital representations of the objects, called mechatronics objects. An MO (Mechatronics object) can carry different facets, e.g., for each view of a discipline. The facets contain the data for a discipline, while the MO-structure aggregates and connects the data. A mechatronics object describes an element in engineering, such as a machine. If the machines are integrated in an assembly line, the mechatronics objects of the machines can be aggregated in a parent mechatronics objects for the assembly line. The concept normally depends on the fact that the mechatronics objects have defined interfaces which can be interconnected, so encapsulation of information is possible.

Figure 1:
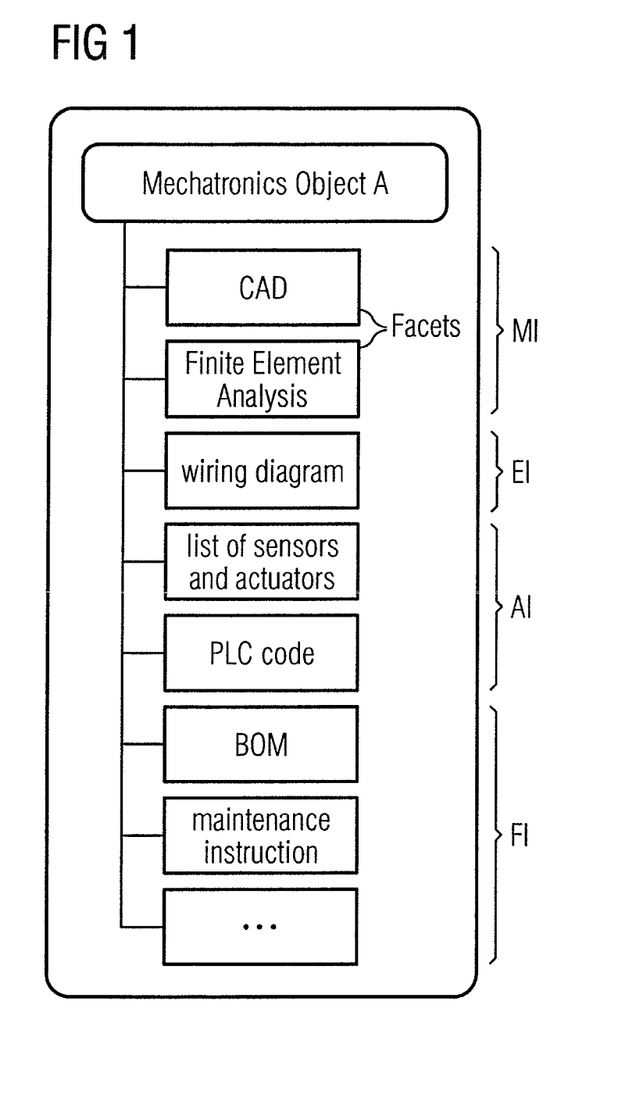
FIG. 1 shows an exemplary setup of a mechatronic object.

FIG. 1 shows an exemplary setup of a mechatronic object comprising several facets. A mechatronic object represents a container for collecting information over the entire lifecycle of a product or an industrial system. The mechatronic object A in FIG. 4 comprises mechanical information MI (CAD, FEM), electrical information EI (wiring diagram), automation information AI (PLC code) and further information FI (BOM, i.e., Bill of Material, Maintenance Instructions, etc). The facet "list of sensors and actuators" is partly electrical information EI and partly automation information AI. It is possible to have several facets for the same domain or discipline and/or to have one facet supporting different domains or disciplines. Therefore, a mechatronic object does not have a fixed number of facets. The number of facets depends on the amount of data and therefore has to be extendable all over the lifecycle of a product (e.g., car, camcorder) or a plant (e.g., power plant).

The mechatronic concept spans a multi-dimensional space having lifecycle aspects, having structural aspects and having information aspects. Therefore, an enrichment of information going along with structuring of information over the lifecycle is provided.

Figure 2:
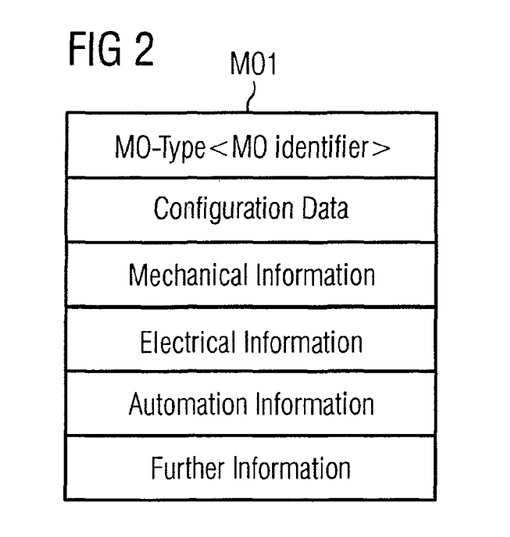
FIG. 2 shows a first schematic overview diagram illustrating a mechatronic object.

FIG. 2 shows a first schematic overview diagram illustrating a mechatronic object MO1. Mechatronic objects MO1 are implemented according the class concept of the object oriented paradigm. A mechatronic object MO1 belongs to a MO-Type or class and inherits all attributes and methods of the underlying class. A mechatronic object MO1 is an instance of a MO-Type and can be referenced by an identifier (MO identifier). Using configuration data, the mechatronic object MO1 can be set up regarding the mode of operation or functioning. The mechatronic object MO1 in FIG. 2 comprises mechanical information (e.g., CAD, FEM), electrical information (e.g., wiring diagram), automation information (e.g., PLC code or control structure) and further information (e.g., Bill of Material, Maintenance Instructions, etc).

Figure 3A:
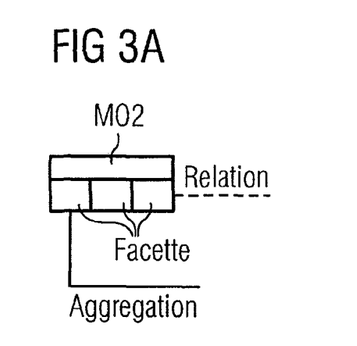
FIG. 3a shows a second schematic overview diagram illustrating a mechatronic object.

FIG. 3*a* shows a schematic overview diagram illustrating a mechatronic object MO2 having facets. A facet normally describes data for one discipline (e.g., data processing, mechanics or electronics, mechanical engineering, electronic engineering, control engineering, systems design engineering, civil engineering, computer engineering). A mechatronic object MO2 can be built by aggregation of other mechatronic objects and can have relations to other mechatronic objects. An aggregation of mechatronic objects is normally done according to a main structure (leading structure) or a classification system.

Figure 3B:
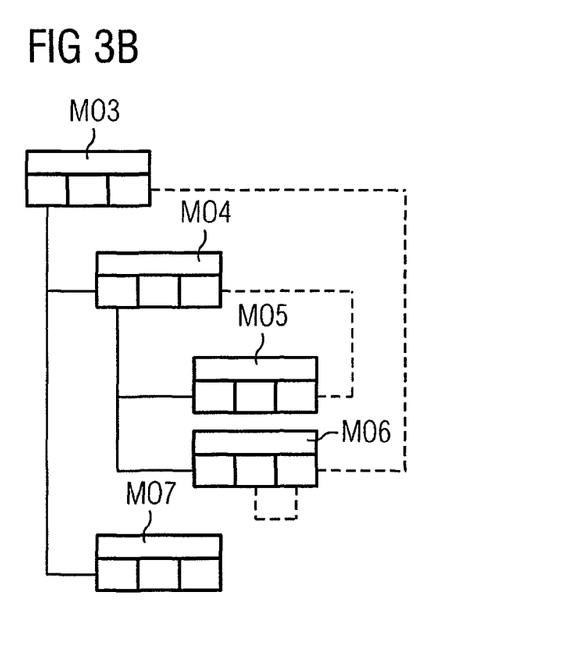
FIG. 3b and an exemplary aggregation of mechatronic objects.

FIG. 3*b* shows an exemplary aggregation of mechatronic objects MO3-MO7. In engineering of industrial systems and plants but also in the product development, the data of different disciplines and roles are grouped along their structures and classification systems. Right now, there is normally a leading aspect for each discipline (e.g., based on mechanical components or functional aspects), after which the data is structured. Through the increased integration of disciplines or also orthogonal functions it is also necessary to support orthogonal structures and classification systems in parallel. The exemplary aggregation of mechatronic objects MO3-MO7 is normally performed according to a main structure or a classification system. A facet normally describes data for one discipline (e.g., data processing, mechanics or electronics).

To support a leading or main structure to integrate all the different disciplines, a concept of mechatronic objects is established. A mechatronic object MO can carry different facets, e.g., one facet for each discipline. The facets contain the data for a discipline, while the MO-structure aggregates (MO3-MO7) and connects the data. A mechatronic object describes an element in engineering, such as a machine. If the machines are integrated in an assembly line, the mechatronic objects of the machines can be aggregated in a parent mechatronic object for the assembly line. The concept normally depends on the fact that the mechatronic objects have defined interfaces which can be interconnected, so encapsulation of information is possible. With the connection of interfaces, another important requirement for mechatronic engineering is fulfilled.

A similar problem occurs with the decomposition of a system in subsystems. Often a system can be decomposed in different ways, but the main structure only allows one way. The other possibilities may still be relevant. For example, a plant can be decomposed using the levels plant, line, cell and machine or it can be structured according to systems, such as a pneumatic system, an air conditioning system or a safety system.

The orthogonal information can be placed on the highest mechatronic objects level MO3 where all the function related mechatronic objects are aggregated, which means in most cases that they will be put at the root node. So the root node MO3 will be crowded with parallel functions which are related to the sub-ordinated mechatronic objects MO4-MO7.

Figure 4:
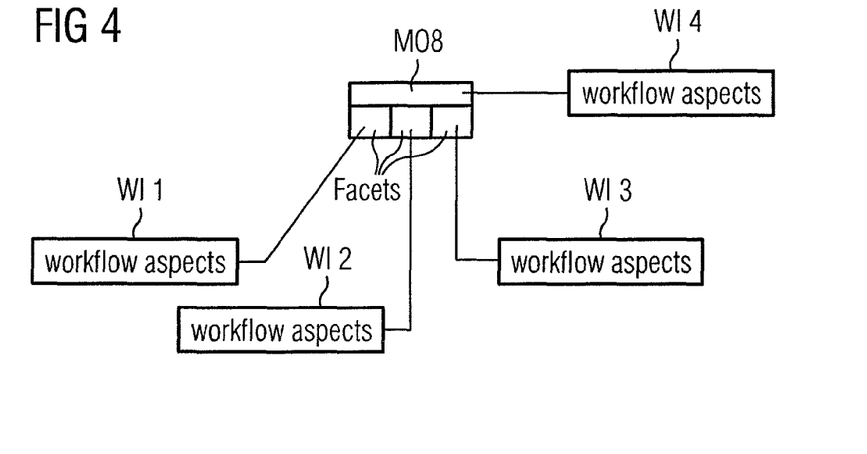
FIG. 4 shows a schematic block diagram illustrating an overview of a mechatronic object with attached workflow information.

FIG. 4 shows a schematic overview diagram illustrating a mechatronic object MO8 with attached workflow information WI1-WI4. One aspect of the invention is to attach workflow aspects (activities and status/resource information) to mechatronics objects MO8 as additional information. This enables a workflow system integrated with mechatronic engineering.

Workflow aspects WI1-WI4 may relate to a whole mechatronics object MO8 or to single facets of a mechatronics object MO8. For example, a mechatronics object "pumping station" also contains a workflow description about general workflow information needed for integration regarding the pumping station, e.g. status information for superordinated workflows: "not available", "erected", "tested", and "available". In addition, the mechatronics object may contain detailed workflow descriptions on a general level but also on a facet level, e.g., the mechatronics object may describe in an activity or by defining explicit activities how to erect or to automate the pumping station but also specifies the skills needed for the design, commissioning, maintenance or even scrapping of the mechatronics object or gives information about dependencies to other mechatronics objects (e.g., the pumping station can be engineered only when the technical constraints on the pumping station are fully known which are provided by adjacent mechatronics objects). Either this information is fully provided by predefined mechatronics object types or the information can be supplemented or changed in instances by the user when utilizing/instantiating the mechatronics object types in a project.

Figure 5:
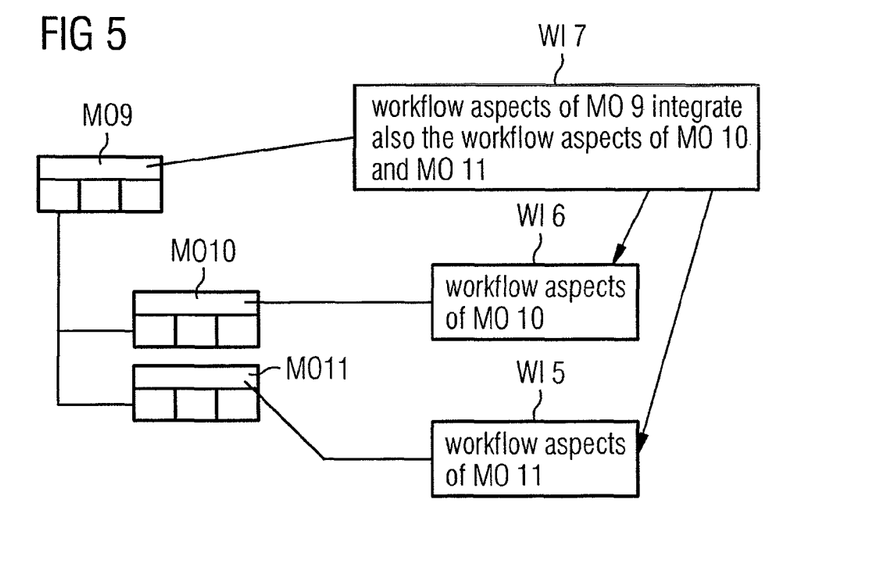
FIG. 5 shows a schematic diagram illustrating an overview of the aggregation of mechatronic objects with attached respective workflow information.

FIG. 5 shows a schematic overview diagram illustrating an aggregation of mechatronic objects MO9-MOI 1 with attached respective workflow information WI5-WI7. The mechatronic object MO9 is the root of the aggregation shown in FIG. 5 and the workflow aspects WI7 of the mechatronic object MO9 also integrates the workflow aspects WI6 of the mechatronic object MO10 and the workflow aspects WI5 of the mechatronic object MOI 1. The workflow aspects WI5-WI7 of the mechatronic objects MO9-MOI 1 can be automatically extracted and merged to generate workflows (e.g., by Parser, Compiler and Generators programs).

Activities defined in mechatronic objects are usually concatenated based on the structure of the mechatronic objects tree and united in a superordinated activity attached to a superordinated mechatronic objects MO9 (e.g., activities of dependent mechatronic objects are serialized or activities of independent mechatronic objects are parallelized in the activity of a superordinated mechatronic object MO9). Status and resource information is also used by superordinated mechatronic objects MO9 in the mechatronic objects tree to aggregate the information to the status and resource information of the superordinated mechatronic object MO9. This means that the status and resource requirements of a mechatronic object can be "calculated" based on the status and resource information of this mechatronic object and its subordinated mechatronic objects. The status can be either used for triggering activities or for getting an overview of the status of the whole project. During project execution, the resource information is used as resource requirements (e.g., kind of expert or laboratory required for how many working hours). These resource requirements must be fulfilled to execute the project. It is also possible to define a number of different statuses which are connected to a project phase.

Figure 6:
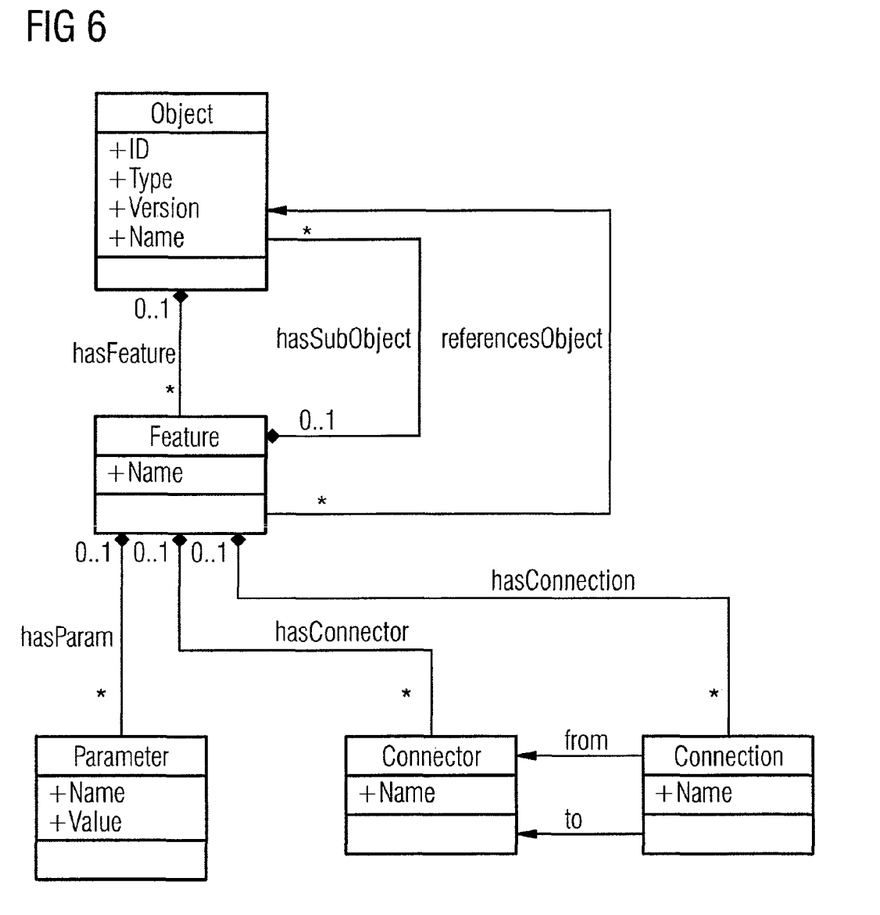
FIG. 6 shows an exemplary for an object oriented representation of a mechatronic object in UML.

FIG. 6 shows an example for an object oriented representation of a mechatronic object using UML or another object oriented notation. Mechatronic objects can be designed and implemented using engineering systems or software development environments supporting the object oriented paradigm (classes, types, inheritance, encapsulation etc). These tools are commodities. FIG. 6 shows in rectangles the involved objects and the parts of objects and the relationships ("is a", "has", "from, "to" etc.) between objects or parts of objects respective between parts of objects. By implementing the mechatronic concept framework formats and specific formats are used. A framework format is an integration basis for different domains and disciplines integrating the specific formats. A specific format comprises information and relationships of a specific domain or discipline.

PLM XML, AutomationML, CAEX, STEP etc. can be used as data formats for a framework format. JT, Collada, PLCopen XML, STEP AP214, AP 210, eClass, ProList etc. can be used as data formats for specific formats.

Figure 7:
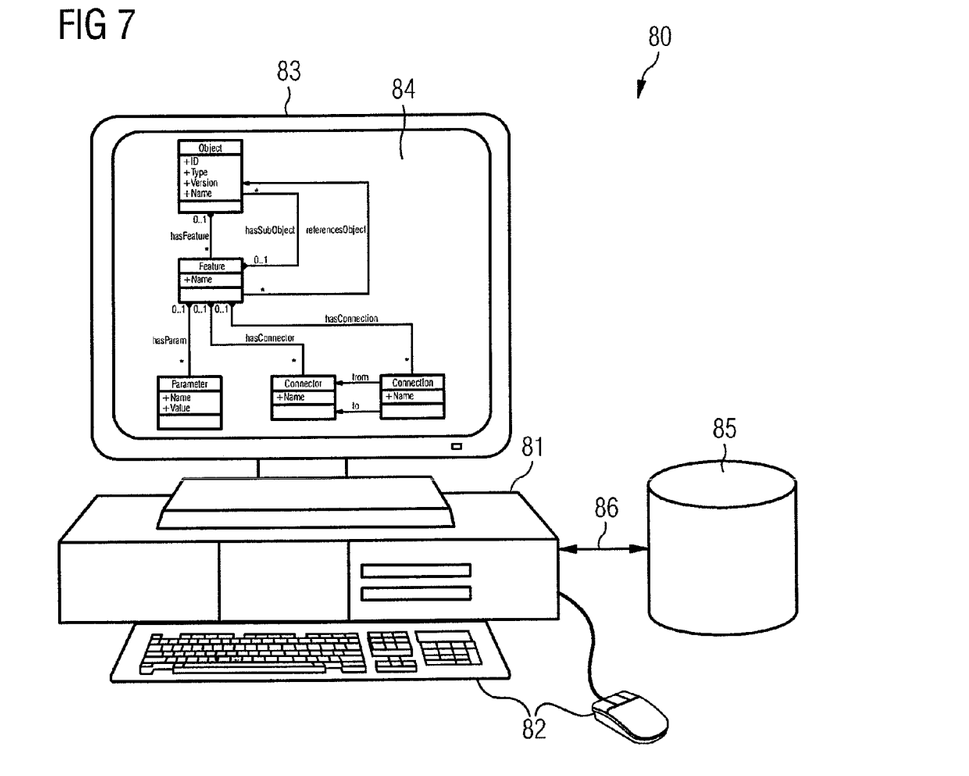
FIG. 7 shows an exemplary system for implementing and using the method in accordance with the invention.

FIG. 7 shows an exemplary system 80 for implementing and using the method in accordance with the invention. The system 80 comprises a processing unit 81 (e.g., Computer, PC, Laptop), an input device 82 (e.g., keyboard, mouse), an output unit 83 (e.g., monitor, display) and a storage device 85 for storing data (e.g., data base, memory). The system 80 can be connected to other systems for distributing data electronically. The illustration on the monitor shows a diagram 84 representing an object oriented structure of a mechatronic object. Mechatronic objects and systems built up by mechatronic objects can be created by using engineering systems or software development environments supporting object oriented paradigms. The storage of mechatronic objects in libraries and allowing others to access to these libraries increases the reusability of mechatronic objects. This furthermore reduces development costs and provides better time to market in the product development and in the design of industrial systems, such as manufacturing systems or plants for process industries. The data communication 86 between the processing unit 81 and the storage device 85 can be realized by a wireless connection or by a wired communication line. The method in accordance with the invention can be via online or via offline communication connected to the storage device 85 (e.g., project or product data base). The workflow aspects of the involved mechatronic objects can be automatically extracted and merged to generate workflows (e.g., by Parser, Compiler and Generators programs) by using commercially available operating systems. The system 80 can be integrated within an engineering system (e.g., CAD System) or coupled to an engineering system.

Figure 8:
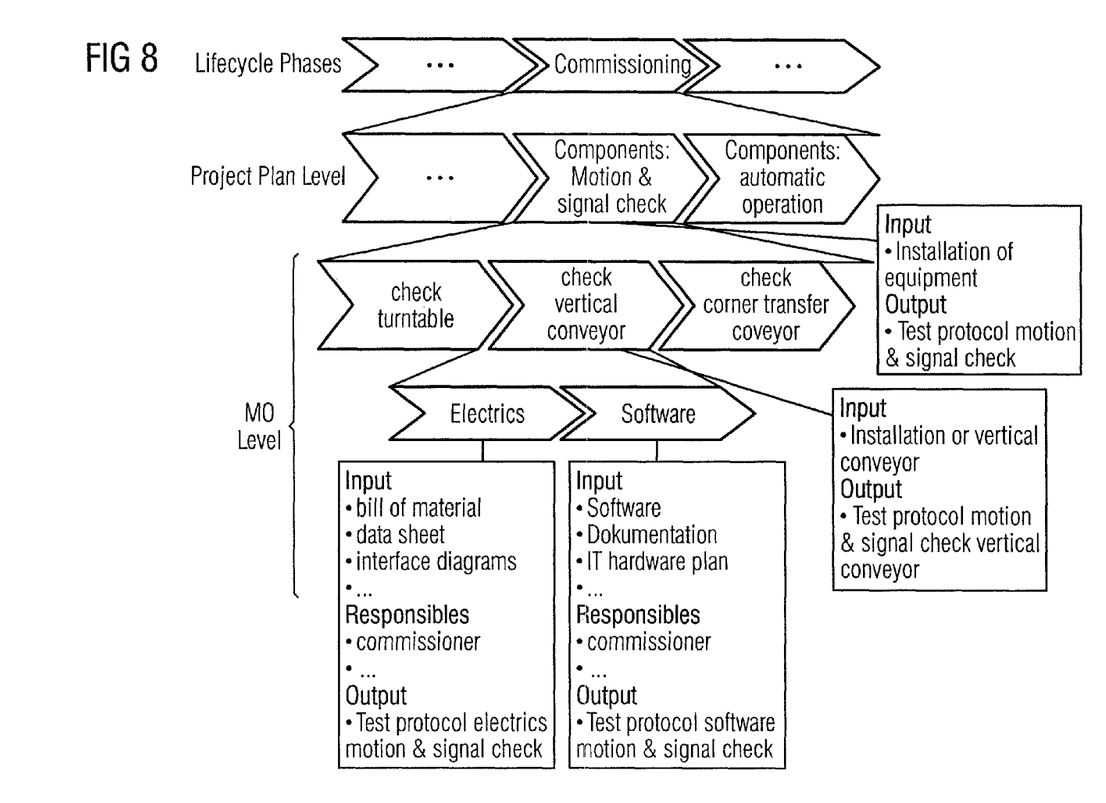
FIG. 8 shows an exemplary breakdown of a project workflow based on mechatronic objects workflow definition in accordance with the invention.

FIG. 8 shows an exemplary breakdown of a project workflow based on mechatronic objects workflow definition. As mentioned above, activities defined in mechatronic objects are usually concatenated based on the structure of the mechatronic objects tree and united in a superordinated activity attached to a superordinated mechatronic objects (e.g., activities of dependent mechatronic objects are serialized or activities of independent mechatronic objects are parallelized in the activity of a superordinated mechatronic object). Status and resource information is also used by superordinated mechatronic objects in the mechatronic objects tree to aggregate the information to the status and resource information of the superordinated mechatronic object. This means that the status and resource requirements of a mechatronic object can be "calculated" based on the status and resource information of this mechatronic object and its subordinated mechatronic objects. The status can be either used for triggering activities or for obtaining an overview of the status of the entire project. During project execution, the resource information is used as resource requirements (e.g., a kind of expert or laboratory required for how many working hours). These resource requirements must be fulfilled to execute the project. It is also possible to define a number of different statuses which are connected to a project phase.

After having created such a project workflow, the workflow system executes the workflow, i.e., triggers activities, calls for user actions, receives user responses and tracks the status of the project. It is possible that the workflow system is split down into two systems: a workflow definition and a workflow execution system.

The user also has the possibility to connect other workflows with these mechatronic objects driven workflows since the mechatronic objects driven workflow usually will be effective starting with the design of the product or plant and related to the technical tasks which have to be done (e.g., commissioning a drive). Additional project planning workflows and project management workflows may be necessary. The workflow system therefore supports embedding mechatronic objects driven workflows into other workflows. This enables the reuse of abstract project workflows or activities as described in the prior chapters of the disclosed invention while introducing fine-grained workflows with few efforts.

The mechatronic objects then need to be attached either manually or automatically to a project workflow which will usually be orthogonal to the mechatronic objects structure. Automated attachment could be done based on unified work package descriptions (e.g., a workflow activity "motion & signal check" is defined in all relevant mechatronic objects)—otherwise, a workflow engineer would attach the affected MOs to this work package in the workflow system and optionally select the relevant activities provided by this mechatronic object—a mechatronic object can provide a number of workflow activities in order to be integrated also in other work packages and/or lifecycle phases of the project. These workflow activities may be classified according to common work packages/workflow activities to allow an automatic workflow generation for the whole project. For example, mechatronic objects could provide workflow activities for the design phase and for the commissioning phase in the industrial plant business—as a consequence, the workflow activities of the subordinated mechatronic objects for the design phase would be considered separately in the superordinated mechatronic object to build one workflow activity for the design phase while another workflow activity for the commissioning phase would be aggregated.

FIG. 8 shows how a project workflow is supplemented by workflow activities given by the mechatronic objects (MO) in the project. Furthermore FIG. 8 illustrates a breakdown of a project workflow based on mechatronic objects workflow definition and possible information that is provided for each workflow activity.

Workflow Aspects

Workflow aspects (WI1-WI7; FIGS. 4 and 5) may relate to an entire mechatronics object or to single facets of a mechatronics object. For example, a mechatronics object "pumping station" contains also a workflow description about general workflow information needed for integration regarding the pumping station, e.g., status information for superordinated workflows: "not available", "erected", "tested", and "available". In addition, the mechatronics object may contain detailed workflow descriptions on a general level but also on a facet level, e.g., the mechatronic object may describe in an activity or by defining explicit activities how to erect or to automate the pumping station but also specifies the skills needed for the design, commissioning, maintenance or even scrapping of the mechatronics object or gives information about dependencies to other mechatronics objects (e.g., the pumping station can be engineered only when the technical constraints on the pumping station are fully known which are provided by adjacent mechatronics objects). Either this information is fully provided by predefined mechatronics object types or the information can be supplemented or changed in instances by the user when utilizing/instantiating the mechatronics object types in a project.

Workflow Strategy

The general workflow aspects of the mechatronics objects are available to be integrated in the next level workflow and can be integrated by the system based on a strategy. This strategy is the basis for the aggregation of workflow activities in super-ordinated mechatronic objects. For this purpose, the system can be parameterized by the user, e.g., for a specific phase in the plant lifecycle (e.g., design, commissioning, maintenance, scrapping), according to available resources (e.g., how many resources are available for mechanics or automation), prioritizations may be made based on the mechatronics objects tree (e.g., design plant area X before plant area Y), and general options may be selected (e.g., one person shall be assigned to one plant area/serialization of tasks in one plant area or as much parallelization as possible). This strategy may be either created individually for each project, there may be a predefined strategy for all projects stored in the system or a standard or predefined strategy can be adjusted for the single projects by the user. The system may offer predefined strategy elements which can be parameterized and combined to create a new strategy but should be open for the introduction of new strategy elements as well (e.g., by using scripts). A typical predefined strategy element that may be used to build a new strategy is the aggregation of the statuses of sub-ordinated objects: In this case, the external status of a mechatronics object is created based on the external status of its underlying or sub-ordinated mechatronics objects e.g. the external status of the parent mechatronics object is calculated by an AND operation out of the external statuses of the underlying objects (maybe the degree of completion of these mechatronic objects) and an internal status of the parent mechatronics object itself (maybe the degree of completion of this mechatronic object). This calculation can be executed recursively on a tree of mechatronics objects. States of mechatronic objects can be used to start activities or to calculate the status of the next level. For example, if all sub-ordinated objects are in a "completed" state then the super-ordinated mechatronic object may be already completed or can be completed after the specific activities of the super-ordinated mechatronic object have been done. A workflow strategy is only required if the workflow aggregation is executed by the system and not manually.

Workflow Aggregation Based on the Workflow Information Provided in the Mechatronic Objects The system then can arrange recursively the next level workflow based on the information provided by the subordinated mechatronics objects and its user-defined strategy. Workflow activities may be added by the user if the information of the sub-ordinated mechatronics objects cannot be taken over completely (e.g., the status of an MO shall be used to trigger the next activity but the user has to decide which is the next activity to start). In general, it is also possible that the user adapts workflow activities as needed for a project or the system just provides the necessary information about subordinated mechatronic objects and the user defines the next level workflow manually based on this information. If a mechatronic object does not provide workflow information then the system can recognize this lack of information. As a result, the user is informed about the missing information and the system introduces a placeholder activity (e.g., "Engineer mechatronic object") and placeholder status which needs to be filled manually by the user or may be deleted by the user, if inadequate. This system-guided supplementation of the workflow may be done immediately or at a later point in time.

Workflow Execution

Once the workflow definition is finished, a user needs to assign resources to the workflow, e.g., persons who are available for automation engineering or mechanics. This assignment of resources is usually done based on roles which are used already in the workflow and to which the persons are now assigned. Finally, the user can start the workflow in the system which tracks the activities, calls for user activities and always displays the status of the project by means of completed, current and still open activities and the status of the mechatronics objects including the aggregation of the statuses up to a project status for project management purposes.

In an embodiment of the invention, is the workflow information is integrated into mechatronics objects as well as the concept for support by a system for creating the project workflow bottom up from detailed mechatronics objects workflows and, thus, closing the gap between project planning and technical support for project engineers. Today, the project workflow is not as detailed and the workflow definition is usually created or adapted manually based on generic templates.

The disclosed embodiments of the Invention provide, among others, the following benefits:

Workflow definition and execution is directly integrated with engineering which may lead to automated status changes or workflow activity acknowledgment without the need for the user to change into the workflow system and therefore without any loss of information. For example, the engineering system could derive the status of an object based on an engineering state of the object and report these status changes to the workflow system. More benefits are possible due to this direct integration.

The effort for the engineering of the project workflow will not dramatically increase although the workflow will definitely be much more detailed, because during the design of a product or plant the workflow is considered inherently. Due to this enhanced granularity of the workflow, the project manager as well as other users with appropriate rights will always get a realistic view on the state of the project.

Project engineers/experts are supported by specific workflow activities which carry all the information they need to perform their task.

Workflow information is directly integrated in mechatronic objects and is therefore attached to the objects to which it belongs. In case of changes of the MO type or objects the workflow information can be adjusted immediately, without having to change the context and without having to search for the connected activities. In addition, workflow information can be added already by the provider of the mechatronic object and therefore should carry information of better quality. This also means that the maintenance of the mechatronic objects workflow information can be done by a "third party" and requires no effort for the user of the mechatronic objects. Workflow information may be also an additional benefit that the mechatronic object providers offer to their customers.

Only approved workflow information can be incorporated in the mechatronic objects, the later workflow should be therefore adequate and "correct". This facilitates and supports the project planning and execution. If also efforts in terms of time needed and costs should be attached to the mechatronic objects, then the workflow system could also be used for verifying the project planning at a very early stage and gives the possibility for early counter measures. During project execution the actual efforts can be entered in the workflow system as well and actual project efforts can be compared to planned project efforts (enables the controlling of the project at a more fine-granular level).

Workflows are mostly or fully generated instead of defined independently, which reduces the probability of human errors and the workflow always "suits" to the project.

The connection of the generated workflows with the abstract project workflows may be necessary but does not mean high efforts.

If a full generation of the workflow is not possible, then at least a partly generated workflow can be created.

The system can make sure that all mechatronic objects are considered in the workflow. For this purpose, the system can point to MOs which do not belong to activities and the user can integrate them to make sure that they are not forgotten and unplanned efforts arise.

Workflows can be completely integrated with engineering and require no additional effort. The system guides the users through their tasks by giving them hints or instructions about what to do next (according to their role in the project) but any task completion executed by the user would be recognized immediately by the system without any further need and effort for the user to trigger this task completion additionally. Vice versa, the system would also recognize when any tasks get incomplete due to user actions (e.g., mechanical parameters are changed and result in inconsistencies with the previously finished electrical instrumentation). This full integration of workflows into engineering enhances the user's acceptance and reduces overhead that may arise through a workflow-driven engineering while keeping the benefits.

Figure 9:
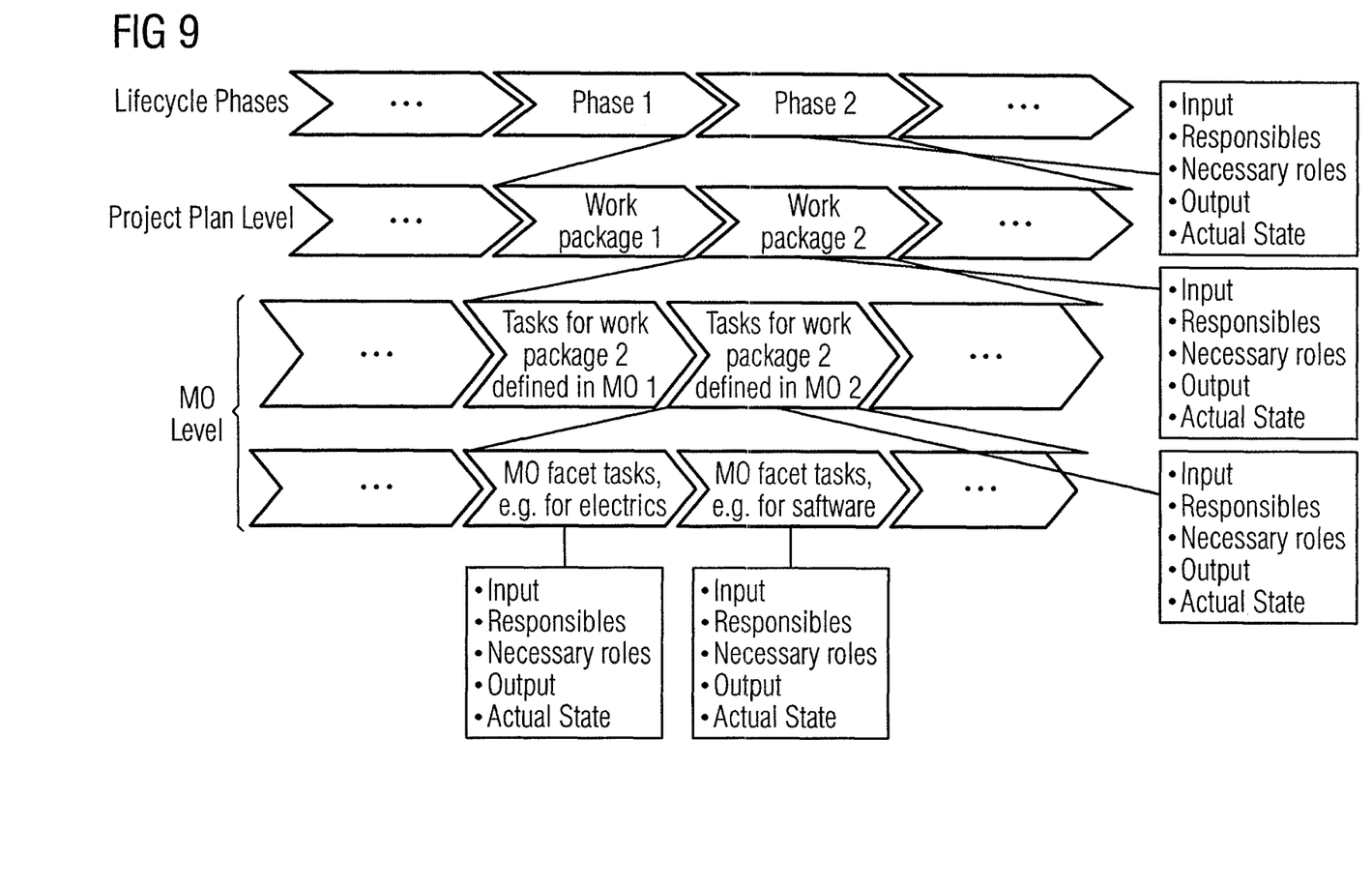
FIG. 9 shows an example for a commissioning project work package with attached mechatronic objects workflow activities in accordance with the invention.

FIG. 9 shows an example for a commissioning project work package with attached mechatronic objects (MO) workflow activities. FIG. 9 shows an example for mechatronic objects (MO)-supported active and distributed workflows in the industrial plant business. For the lifecycle phase commissioning, there are a number of work packages defined in the project plan such as the motion and signal check of all components. In the engineering system, the concerned mechatronic objects which represent these components are known and are either attached automatically or manually to this work package or workflow activity in the workflow system. In this example, the (optionally predefined) activities attached to the mechatronic objects and their facets are shown, i.e., for the check of the vertical conveyor the mechatronic object facets electrics and software define activities which contribute to the mechatronic object activity check vertical conveyor.

Figure 10:
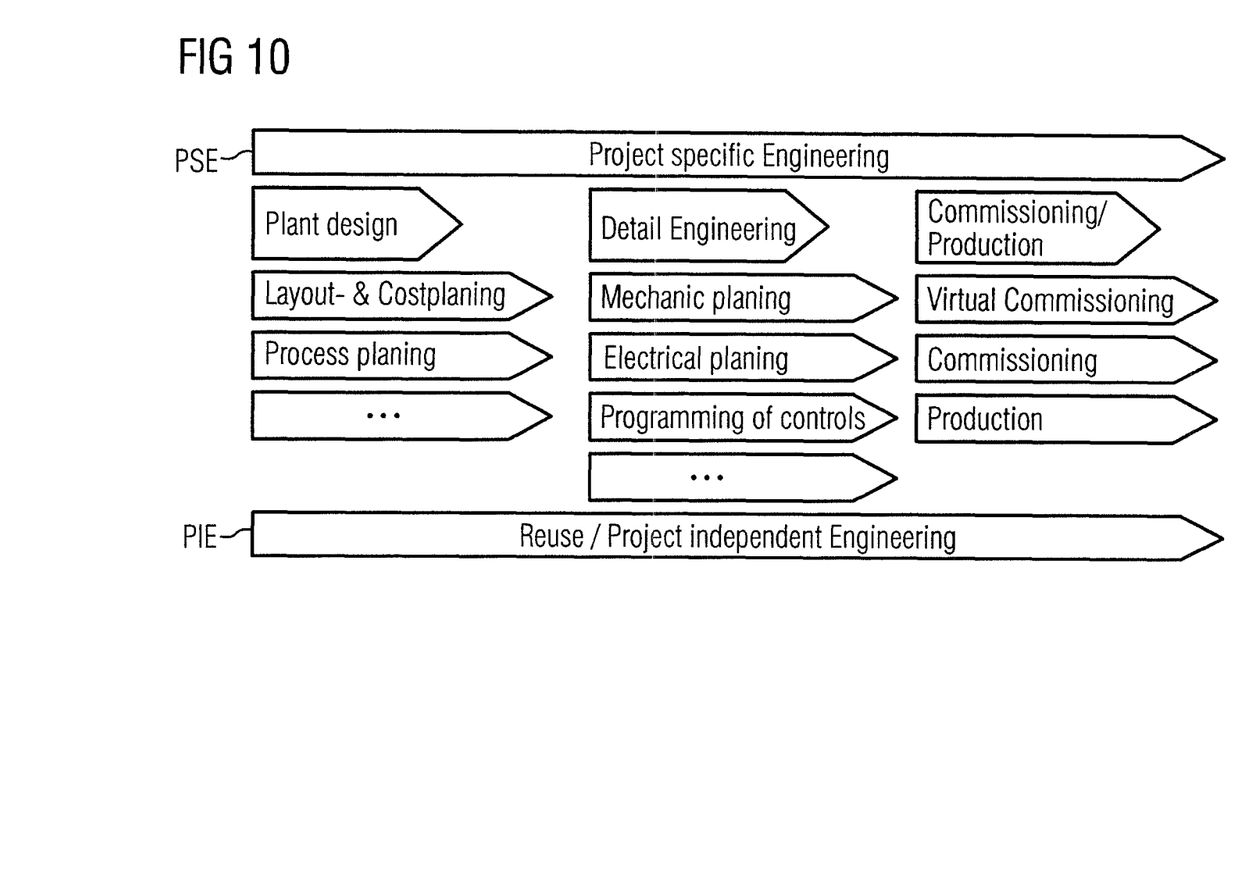
FIG. 10 shows the use of mechatronic integration in an exemplary engineering workflow in accordance with the invention.

Each of the work packages on project level also defines the input and output with respect to the workflow which shall be executed. This specification is then filled by the activities of the attached mechatronic objects. In case the vertical conveyor is represented also by an mechatronic objects structure, then this workflow activity may be composed of workflow activities of those underlying mechatronic objects. It should be noted that the mechatronic object vertical conveyor probably defines separate workflow activities, e.g., for engineering, installing and maintaining the conveyor. These phase-specific activities would be aggregated independently in order to obtain appropriate activities for each of these phases FIG. 10 shows the use of mechatronic integration in an exemplary engineering workflow. Mechatronic objects can be used in project specific engineering PSE, e.g., in the phases plant design, detail engineering and commissioning/production and in project independent engineering PIE. Benefits in project specific engineering are among others reduction of complexity by encapsulation of the information and the semantic description of interfaces. Benefits in the phase plant design are among others the continuous use of structures and data from design. Benefits in the phase detail engineering are among others parallel engineering (e.g., by integrating and creating of craft respective trade specific views). Benefits in the phase commissioning/production are among others use of simulation, test, and validation of results.

Benefits of mechatronic objects in the project independent engineering PIE workflow are among others improved reusability of work results by providing and using libraries of types of mechatronic objects and by applying object oriented instantiation concepts (types, templates etc). Workflows can be generated regarding project independent engineering PIE aspects and/or regarding project specific engineering PSE aspects.

In engineering of industrial systems and plants but also in the product development, the data of different disciplines and roles are grouped along their structures and classification systems. Right now, there is normally a leading aspect for each discipline (e.g., based on mechanical components or functional aspects), after which the data is structured. Through the increased integration of disciplines or also orthogonal functions it is also necessary to support orthogonal structures and classification systems in parallel. To support a leading structure to integrate all the different disciplines, a concept of mechatronic objects is established. A mechatronic object can carry different facets, e.g., one facet for each discipline. The facets contain the data for a discipline, while the mechatronic object structure aggregates and connects the data. A mechatronic object describes an element in engineering, such as a machine. If the machines are integrated in an assembly line, the mechatronic objects (MO) of the machines can be aggregated in a parent mechatronic object for the assembly line. The concept normally depends on the fact that the mechatronic objects have defined interfaces which can be interconnected, so encapsulation of information is possible. Based on workflow information and aspects included in mechatronic objects the workflow for product development or for the design or the operation of an industrial system can be generated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for generating workflows for design of an industrial system or operation of the industrial system, a workflow comprising activities, inputs, outputs, attributes, and time dependencies for activities, the method comprising the steps of:

providing software objects representing at least one of parts, functions and artifacts of the industrial system, a software object comprising data for characterizing the software object and interfaces for intercommunication of the software objects and for communication with an environment of the industrial system;

assembling, in a microprocessor, the software objects by interconnecting said software objects via the interfaces to design the industrial system, the software objects having workflow information dedicated to at least one of the part, functions and artifacts of the industrial system to be designed or operated, and a root software object being provided with parallel functions which are related to subordinate software objects; and generating, by the microprocessor, a workflow for design of the industrial system or operation of the industrial system based on the workflow information;

wherein the software objects carry different facets, wherein a facet comprises data for a respective discipline and for discipline spanning information; and wherein the workflow is generated in a bottom up manner beginning with software objects having a greatest level of detail.

2. The method according to claim 1, further comprising the step of:
storing the generated workflow in a memory unit.

3. The method according to claim 1, further comprising the step of:
displaying the generated workflow on a display unit.

4. The method according to claim 1, wherein each of the software objects represent at least one of the parts, the functions and the artifacts of the industrial system being provided by an engineering system.

5. The method according to claim 1, further comprising the step of:
migrating the generated workflow into at least one of a project management and planning tool.

6. The method according to claim 1, wherein each of the software objects is a mechatronic object comprising data regarding disciplines selected from at least one of mechanical engineering, electronic engineering, control engineering, systems design engineering, civil engineering and computer engineering.

7. The method according to claim 1, wherein the workflow information is assigned to at least one facet belonging to the respective discipline.

8. The method according to claim 1, wherein sub-workflows are generated according to disciplines or facets, and wherein the sub-workflows are configured to be aggregated to user defined super-workflows.

9. The method according to claim 1, wherein the workflow is generated based on a workflow policy.

10. The method according to claim 1, wherein the workflow is generated in the bottom up manner starting from one of a user defined process and an abstraction layer.

11. The method according to claim 1, wherein the workflow is automatically generated by a computer implemented tool.

12. A non-transitory computer readable medium encoded with a computer program executing on a processor, which when used on a computer apparatus, causes the processor to generating workflows for design of an industrial system or operation of the industrial system, the computer program comprising:

program code for providing software objects representing at least one of parts, functions and artifacts of the industrial system, a software object comprising data for characterizing the software object and interfaces for intercommunication of the software objects and for communication with an environment of the industrial system;

program code for assembling, in the processor, the software objects by interconnecting said software objects via the interfaces to design the industrial system, the software objects having workflow information dedicated to at least one of the part, functions and artifacts of the industrial system to be one of designed or operated, and a root software object being provided with parallel functions which are related to subordinate software objects; and program code for automatically generating, by the processor, the workflow for one of the development of the product and one of the design and the operation of the industrial system based on the workflow information;

wherein the workflow comprises activities, inputs, outputs, and attributes for the activities and relationships between activities;

wherein the software objects carry different facets, wherein a facet comprises data for a respective discipline and for discipline spanning information; and wherein the workflow is generated in a bottom up manner beginning with software objects having a greatest level of detail.

13. A system including a processor having memory for generating workflows for design of an industrial system or operation of the industrial system, a workflow comprising activities, inputs, outputs, and attributes for the activities, the system comprising:

a providing unit configured to provide software objects representing at least one of parts, functions and artifacts of the industrial system, a software object comprising data for characterizing the software object and interfaces for intercommunication of the software objects and for communication with an environment of the industrial system;

a design unit configured to assemble the software objects by interconnecting said software objects via the interfaces to design the industrial system, the software objects having workflow information dedicated to at least one of the part, functions and artifacts of the industrial system to be designed or operated, and a root software object being provided with parallel functions which are related to subordinate software objects;

a generation unit configured to automatically generate the workflow for the design or operation of the industrial system based on the workflow information;

a storing unit for storing the generated workflow; and an output unit for presenting the generated workflow;

wherein the software objects carry different facets, wherein a facet comprises data for a respective discipline and for discipline spanning information; and wherein the workflow is generated in a bottom up manner beginning with software objects having a greatest level of detail.

14. The system according to claim 13, further comprising:
a coupling mechanism for data exchange with one of an engineering system and a project management tool.

* * * * *